United States Patent
Steinbrecher

(10) Patent No.: US 8,439,397 B1
(45) Date of Patent: May 14, 2013

(54) AIRBAGS COMPRISING HINGEDLY AFFIXED NON-INFLATABLE SUPPORT MEMBERS

(75) Inventor: Robert C. Steinbrecher, Dexter, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 13/482,372

(22) Filed: May 29, 2012

(51) Int. Cl.
*B60R 21/16* (2006.01)

(52) U.S. Cl.
USPC .................................... 280/730.2; 280/743.2

(58) Field of Classification Search ............... 280/728.2, 280/729, 730.2, 743.1, 743.2
See application file for complete search history.

(56) References Cited

U.S. PATENT DOCUMENTS

| | | | |
|---|---|---|---|
| 5,636,862 A | 6/1997 | Cheung et al. | |
| 5,845,935 A | 12/1998 | Enders et al. | |
| 6,378,897 B1 * | 4/2002 | Butters et al. | 280/730.2 |
| 7,172,212 B2 * | 2/2007 | Aoki et al. | 280/730.2 |
| 7,275,761 B2 | 10/2007 | Gould et al. | |
| 7,549,672 B2 | 6/2009 | Sato et al. | |
| 7,559,572 B2 | 7/2009 | Roberts et al. | |
| 7,661,701 B2 | 2/2010 | Hirata | |
| 7,712,766 B2 | 5/2010 | Gutmann et al. | |
| 7,712,774 B2 * | 5/2010 | Garner et al. | 280/730.2 |
| 7,850,202 B2 | 12/2010 | Boxey et al. | |
| 7,967,334 B2 | 6/2011 | Breuninger et al. | |
| 8,033,569 B2 | 10/2011 | Yamanishi et al. | |
| 2002/0175502 A1 * | 11/2002 | Tesch et al. | 280/730.2 |
| 2003/0111828 A1 | 6/2003 | Dominissini | |
| 2003/0168835 A1 * | 9/2003 | Thomas et al. | 280/730.2 |
| 2006/0290122 A1 * | 12/2006 | Woydick | 280/743.2 |
| 2008/0106073 A1 * | 5/2008 | Garner et al. | 280/728.2 |
| 2009/0058053 A1 * | 3/2009 | Osterhout et al. | 280/730.2 |

* cited by examiner

*Primary Examiner* — Joseph Rocca
*Assistant Examiner* — Robert A Coker
(74) *Attorney, Agent, or Firm* — Dinsmore & Shohl LLP

(57) ABSTRACT

Airbags including hingedly affixed non-inflatable support members and vehicles including such airbags are disclosed. An airbag includes a body portion, a non-inflatable support member having a proximal end and a distal end, and a tether having a support-member-end and an airbag-end. The proximal end of the non-inflatable support member is hingedly affixed to the body portion of the airbag. The support-member-end of the tether is affixed to the distal end of the non-inflatable support member and the airbag-end of the tether is affixed to the body portion of the airbag, thereby tethering the distal end of the non-inflatable support member to the airbag. When the airbag is in a pre-deployment state, the distal end of the non-inflatable support member does not extend beyond a perimeter of the airbag. The non-inflatable support member extends beyond the perimeter of the airbag in a deployed position.

20 Claims, 4 Drawing Sheets

AIRBAGS COMPRISING HINGEDLY AFFIXED NON-INFLATABLE SUPPORT MEMBERS

TECHNICAL FIELD

Embodiments provided herein generally relate to airbags, and more specifically, to airbags comprising hingedly affixed non-inflatable support members.

BACKGROUND

Airbags, including vehicle airbags such as side curtain airbags, are typically stored in a compact state within a closed airbag storage compartment. Upon deployment, the airbag is inflated and expands into a deployed state. It may be desirable to provide support to the airbag when the airbag is in a deployed state. The present disclosure is directed to airbags comprising non-inflatable support members.

SUMMARY

In one embodiment, an airbag includes a body portion, a non-inflatable support member having a proximal end and a distal end, and a tether having a support-member-end and an airbag-end. The proximal end of the non-inflatable support member is hingedly affixed to the body portion of the airbag. The support-member-end of the tether is affixed to the distal end of the non-inflatable support member and the airbag-end of the tether is affixed to the body portion of the airbag, thereby tethering the distal end of the non-inflatable support member to the airbag. When the airbag is in a pre-deployment state, the non-inflatable support member is folded over the body portion in a pre-deployment position, in which the distal end of the non-inflatable support member does not extend beyond a perimeter of the airbag. As the airbag fills with gas when deployed, the airbag expands and creates tension in the tether, which is translated to the distal end of the non-inflatable support member, thereby pulling the non-inflatable support member to a deployed position that extends beyond the perimeter of the airbag.

In another embodiment, a vehicle includes a passenger compartment and an airbag located within the passenger compartment. The airbag includes a body portion, a non-inflatable support member having a proximal end and a distal end, and a tether having a support-member-end and an airbag-end. The proximal end of the non-inflatable support member is hingedly affixed to the body portion of the airbag. The support-member-end of the tether is affixed to the distal end of the non-inflatable support member and the airbag-end of the tether is affixed to the body portion of the airbag, thereby tethering the distal end of the non-inflatable support member to the airbag. When the airbag is in a pre-deployment state, the non-inflatable support member is folded over the body portion in a pre-deployment position, in which the distal end of the non-inflatable support member does not extend beyond a perimeter of the airbag. As the airbag fills with gas when deployed, the deploying airbag creates tension in the tether, which is translated to the distal end of the non-inflatable support member, thereby pulling the non-inflatable support member to a deployed position that extends beyond the perimeter of the airbag and contacts an interior portion of the passenger compartment of the vehicle to support the deployed airbag.

In yet another embodiment, an airbag includes a body portion, a non-inflatable support member having a proximal end and a distal end, and a tether having a support-member-end and an airbag-end. The body portion includes an inflatable portion that inflates with gas when the airbag is deployed and a non-inflatable portion that does not inflate with gas when the airbag is deployed. The proximal end of the non-inflatable support member is hingedly affixed to the body portion of the airbag. The support-member-end of the tether is affixed to the distal end of the non-inflatable support member and the airbag-end of the tether is affixed to the non-inflatable portion of the body portion of the airbag, thereby tethering the distal end of the non-inflatable support member to the airbag. When the airbag is in a pre-deployment state, the non-inflatable support member is folded over the body portion in a pre-deployment position, in which the distal end of the non-inflatable support member does not extend beyond a perimeter of the airbag. As the airbag fills with gas when deployed, the deploying airbag creates tension in the tether, which is translated to the distal end of the non-inflatable support member, thereby pulling the non-inflatable support member to a deployed position that extends beyond the perimeter of the airbag.

These and additional features provided by the embodiments described herein will be more fully understood in view of the following detailed description, in conjunction with the drawings.

DETAILED DESCRIPTION OF THE DRAWINGS

Figure 2A:
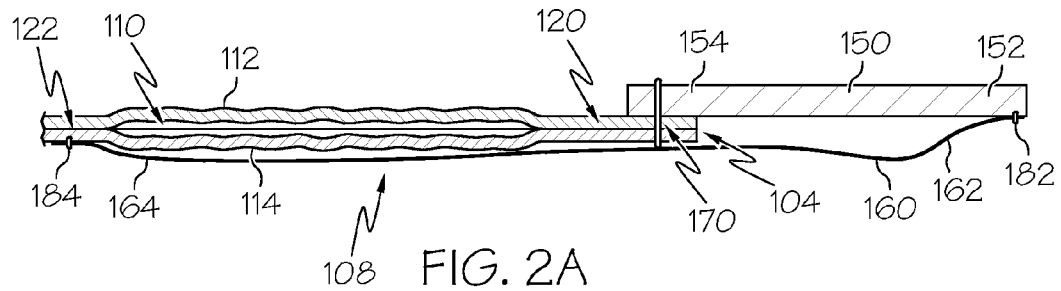
FIG. 2A schematically depicts a partial cross section of the airbag of FIG. 1, illustrating the configuration of the non-inflatable support member when the airbag is in an assembly state, according to one or more embodiments shown and described herein.
Figure 2B:
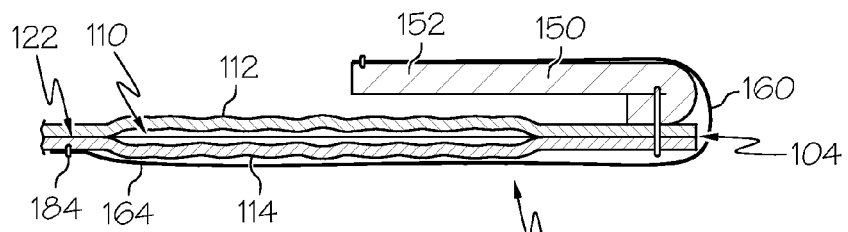
FIG. 2B schematically depicts a partial cross section of the airbag of FIG. 1 illustrating the configuration of the non-inflatable support member when the airbag is in a pre-deployment state, according to one or more embodiments shown and described herein.
Figure 2C:
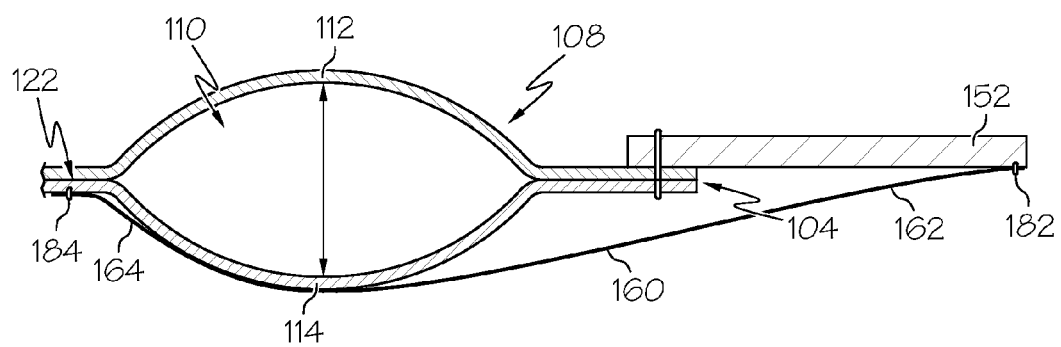
FIG. 2C schematically depicts a partial cross section of the airbag of FIG. 1 illustrating the configuration of the non-inflatable support member when the airbag is in a deployed state, according to one or more embodiments shown and described herein.

FIGS. 2A-2C generally depict partial cross sections of an airbag that includes a hingedly affixed non-inflatable support member 150 in an assembly state (FIG. 2A), in a pre-deployment state (FIG. 2B) and in a deployed state (FIG. 2C). The airbag generally comprises a body portion 108, a non-inflatable support member 150 having a proximal end 154 and a distal end 152, and a tether 160 having a support-member-end 162 and an airbag-end 164. The proximal end 154 of the non-inflatable support member 150 is hingedly affixed to the body portion 108 of the airbag. The support-member-end 162 of the tether 160 is affixed to the distal end 152 of the non-inflatable support member 150 and the airbag-end 164 of the tether 160 is affixed to the body portion 108 of the airbag, thereby tethering the distal end 152 of the non-inflatable support member 150 to the airbag. When the airbag is in a pre-deployment state (FIG. 2B), the non-inflatable support member 150 is folded over the body portion 108 in a pre-deployment position, in which the distal end 152 of the non-inflatable support member 150 does not extend beyond a perimeter 104 of the airbag. As the airbag fills with gas when deployed (FIG. 2C), the airbag expands and creates tension in the tether 160, which is translated to the distal end 152 of the non-inflatable support member 150, thereby pulling the non-inflatable support member 150 to a deployed position that extends beyond the perimeter 104 of the airbag. Airbags and vehicles including airbags will be described in more detail herein with specific reference to the corresponding drawings.

While the airbags of the present disclosure will be described in the context of a side curtain airbag that may be installed in a vehicle (e.g., an automobile vehicle, an airplane, a boat, a recreational vehicle, etc.), it should be understood that embodiments of the airbags described herein are not limited to side curtain airbags installed in vehicles. In some embodiments, the airbags of the present disclosure may be installed in vehicles, but may not be side curtain airbags. Further, the airbags of the present disclosure may be utilized in contexts other than vehicles.

Figure 1:
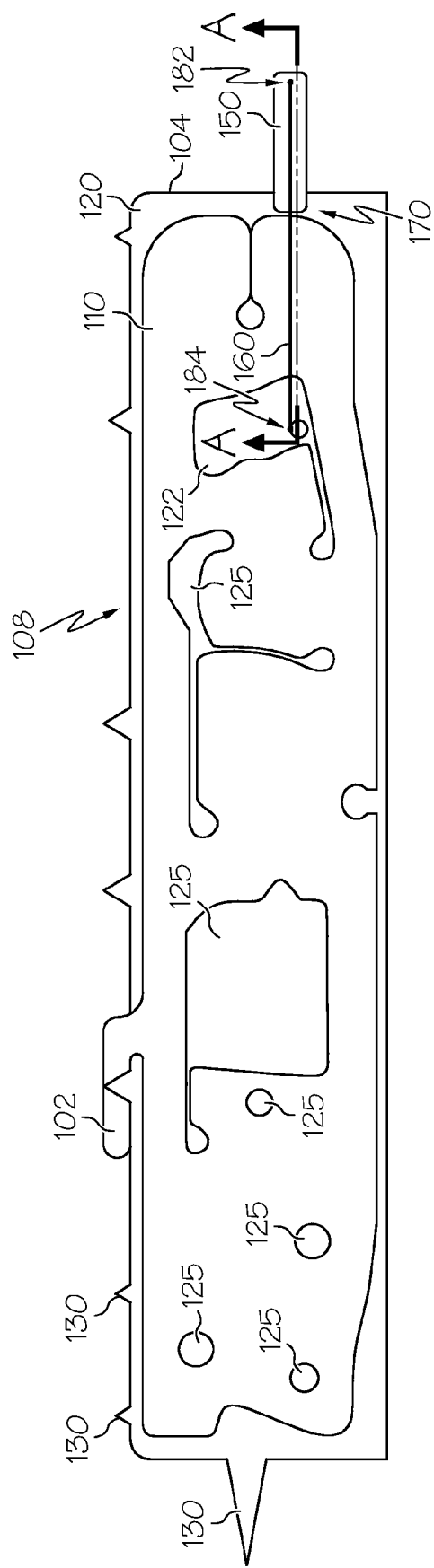
FIG. 1 schematically depicts a side view of an unrolled and uninflated side curtain airbag that includes a hingedly affixed non-inflatable support member, according to one or more embodiments shown and described herein.

Referring now to FIG. 1, a side view of an unrolled and uninflated side curtain airbag 100 that includes a hingedly affixed non-inflatable support member 150 is schematically depicted. A perimeter 104 extends around the outside of the side curtain airbag 100. As illustrated in FIG. 1, the side curtain airbag 100 includes an inflator 102 through which gas may be introduced into the side curtain airbag 100 to facilitate deployment. While the side curtain airbag 100 depicted in FIG. 1 includes one inflator 102, in other embodiments, the side curtain airbag 100 may include multiple inflators for introducing gas into the side curtain airbag 100.

As depicted in FIG. 1, the side curtain airbag 100 also includes a number of tether attachment points (schematically indicated in FIG. 1 by the triangles 130), each of which may attach the side curtain airbag to a body portion of a vehicle with a tether (not shown). In other embodiments, the side curtain airbag may include more or less tether attachment points than depicted in FIG. 1. In still other embodiments, the side curtain airbag 100 may be attached to a body portion of the vehicle in one or more locations in a manner other than, or in addition to, tethers.

The side curtain airbag 100 includes a body portion 108. As depicted in FIG. 1, the body portion 108 comprises an inflatable portion 110, a first non-inflatable portion 120, a second non-inflatable portion 122, and a plurality of other non-inflatable portions 125. When gas is introduced into the side curtain airbag through inflator 102, the inflatable portion 110 inflates with gas while the non-inflatable portions remain un-inflated. While the embodiment depicted in FIG. 1 includes one inflatable portion 110, other embodiments may include more than one inflatable portion. Similarly, other embodiments may have more or less non-inflatable portions than are depicted in FIG. 1.

The side curtain airbag 100 includes a non-inflatable support member 150 that is hingedly affixed to the body portion 108 at an attachment point 170. In some embodiments, the non-inflatable support member 150 may be formed from plastic, metal, or a composite material. However, it should be understood that, in other embodiments, the non-inflatable support member 150 may be formed from a different material.

The non-inflatable support member 150 is tethered to the side curtain airbag 100 by a tether 160. The tether 160 has a support-member end that is attached to the non-inflatable support member 150 at attachment point 182 and an airbag-end that is attached to the side curtain airbag 100 at attachment point 184.

While the non-inflatable support member 150 is hingedly affixed to the side curtain airbag 100 at attachment point 170, in other embodiments, the non-inflatable support member 150 may be hingedly affixed to the side curtain airbag 100 at a different attachment point. Further, while only one non-inflatable support member 150 is hingedly affixed to the side curtain airbag depicted in FIG. 1, in other embodiments, at least one additional non-inflatable support member may be hingedly affixed to the side curtain airbag 100 and tethered to the side curtain airbag 100 by at least one additional tether.

Further detail with respect to the hinged attachment of the non-inflatable support member 150 to the side curtain airbag 100 and the tethering of the non-inflatable support member 150 to the side curtain airbag 100 will be provided below in reference to FIGS. 2A-2C.

Referring now to FIG. 2A, a partial cross section of the side curtain airbag 100 of FIG. 1, taken along the A-A line of FIG. 1, is schematically depicted, showing the configuration of the non-inflatable support member 150 and the tether 160 when the side curtain airbag 100 is in an assembly state (i.e., before the side curtain airbag 100 is assembled into a vehicle). The first non-inflatable portion 120 is directly adjacent to the perimeter 104. The second non-inflatable portion 122 is not directly adjacent to the perimeter 104, instead being located at a position interior to the perimeter 104. The inflatable portion 110 is positioned between the first non-inflatable portion 120 and the second non-inflatable portion 122.

The non-inflatable support member 150 has a proximal end 154 and a distal end 152. The proximal end 154 of the non-inflatable support member 150 is hingedly affixed to the body portion of the side curtain airbag 100 at attachment point 170. In some embodiments, the non-inflatable support member 150 is hingedly affixed to the body portion of the side curtain airbag 100 by stitching. In such embodiments, the stitching may be nylon thread. In other embodiments, the non-inflatable support member 150 may be hingedly affixed to the body portion of the side curtain airbag 100 by other means, including, but not limited to, an adhesive or one or more fasteners. In still other embodiments, the non-inflatable support member 150 may be hingedly affixed to the body portion of the side curtain airbag 100 by integrating the non-inflatable support member 150 with the fabric of the side curtain airbag 100, such as when the non-inflatable support member 150 is integrally formed with the fabric of the side curtain airbag 100 at the time of fabrication.

In the embodiment depicted in FIG. 2A, the non-inflatable support member 150 is hingedly affixed to the body portion of the side curtain airbag 100 at an attachment point 170 that is located on the first non-inflatable portion 120 that is directly adjacent to the perimeter 104 of the side curtain airbag 100. However, it should be understood that in other embodiments the non-inflatable support member 150 may be hingedly affixed to the side curtain airbag 100 at a different location, including, without limitation, to the inflatable portion 110 of the side curtain airbag 100 or to the second non-inflatable portion 122 that is not directly adjacent to the perimeter 104.

The tether 160 tethers the distal end 152 of the non-inflatable support member 150 to the side curtain airbag 100. The tether 160 has a support-member-end 162 and an airbag-end 164. The support-member-end 162 of the tether 160 is affixed to the distal end 152 of the non-inflatable support member 150 at attachment point 182. The airbag-end 164 of the tether 160 is affixed to the body portion of the side curtain airbag 100 at attachment point 184. The tether 160 may be affixed to the non-inflatable support member 150 and/or the side curtain airbag 100 in a number of ways, including, but not limited to, by stitching, by adhesive, or by one or more fasteners.

As depicted in FIG. 2A, the airbag-end 164 of the tether 160 is affixed to the body portion of the side curtain airbag 100 at an attachment point 184 located at an interior location that is not directly adjacent to the perimeter 104 of the side curtain airbag 100. As depicted in FIG. 2A, the airbag-end 164 of the tether 160 is affixed to the second non-inflatable portion 122 of the side curtain airbag 100 at an attachment point 184 that is not directly adjacent to the perimeter 104. However, it should be understood that, in other embodiments, the airbag-end 164 of the tether may be affixed to the body portion of the side curtain airbag 100 at another location, including, without limitation, to the inflatable portion 110 of the side curtain airbag 100. In other embodiments, the attachment point 184 may be located closer to or further from the perimeter 104 than depicted in FIG. 2A.

The side curtain airbag 100 may transition from the assembly state depicted in FIG. 2A to a pre-deployment state depicted in FIG. 2B by folding/rolling the side curtain airbag 100 into a more compact form, for example. Referring now to FIG. 2B, a partial cross section of the side curtain airbag 100 of FIG. 1, taken along the A-A line of FIG. 1, is schematically depicted, showing the configuration of the non-inflatable support member 150 and the tether 160 when the side curtain airbag 100 is in a pre-deployment state. When the side curtain airbag 100 is in the pre-deployment state, the non-inflatable support member 150 is folded over the body portion of the side curtain airbag 100, such that the non-inflatable support member 150 is in a pre-deployment position. In the pre-deployment position depicted in FIG. 2B, the distal end 152 of the non-inflatable support member 150 does not extend beyond the perimeter 104 of the side curtain airbag 100.

As depicted in FIG. 2B, the inflatable portion 110 of the body portion of the side curtain airbag 100 includes a first side 112 and a second side 114. The non-inflatable support member is folded over to be more proximate to the first side 112 than the second side 114 when in the pre-deployment position. In one embodiment, the tether 160 is routed from the distal end 152 of the non-inflatable support member 150, along a side of the non-inflatable support member 150 that is opposite (e.g., the side not facing) the first side 112 of the inflatable portion 110, around the perimeter 104 of the side curtain airbag 100, and along the second side 114 of the inflatable portion 110 to the attachment point 184 at which the airbag-end 164 of the tether 160 is affixed to the side curtain airbag 100. It should be understood that in other embodiments the tether 160 may be routed in a manner other than that depicted in FIG. 2B.

As illustrated by the transition from FIG. 2B to FIG. 2C, when the side curtain airbag 100 deploys, the side curtain airbag fills with gas. As the side curtain airbag 100 fills with gas, gas is introduced into the inflatable portion 110. As gas is introduced into the inflatable portion 110, the first side 112 and the second side 114 of the inflatable portion 110 expand outward, causing the airbag to unroll or deploy. As the first side 112 and the second side 114 of the inflatable portion 110 expand outward, the second side 114 of the expanding inflatable portion 110 of the deploying side curtain airbag creates tension in the tether 160, which is translated to the distal end 152 of the non-inflatable support member 150, thereby pulling the non-inflatable support member 150 to a deployed position. Referring now to FIG. 2C, the non-inflatable support member 150 is schematically depicted in the deployed position. In the deployed position, the distal end 152 of the non-inflatable support member 150 extends beyond the perimeter 104 of the side curtain airbag 100.

Figure 3:
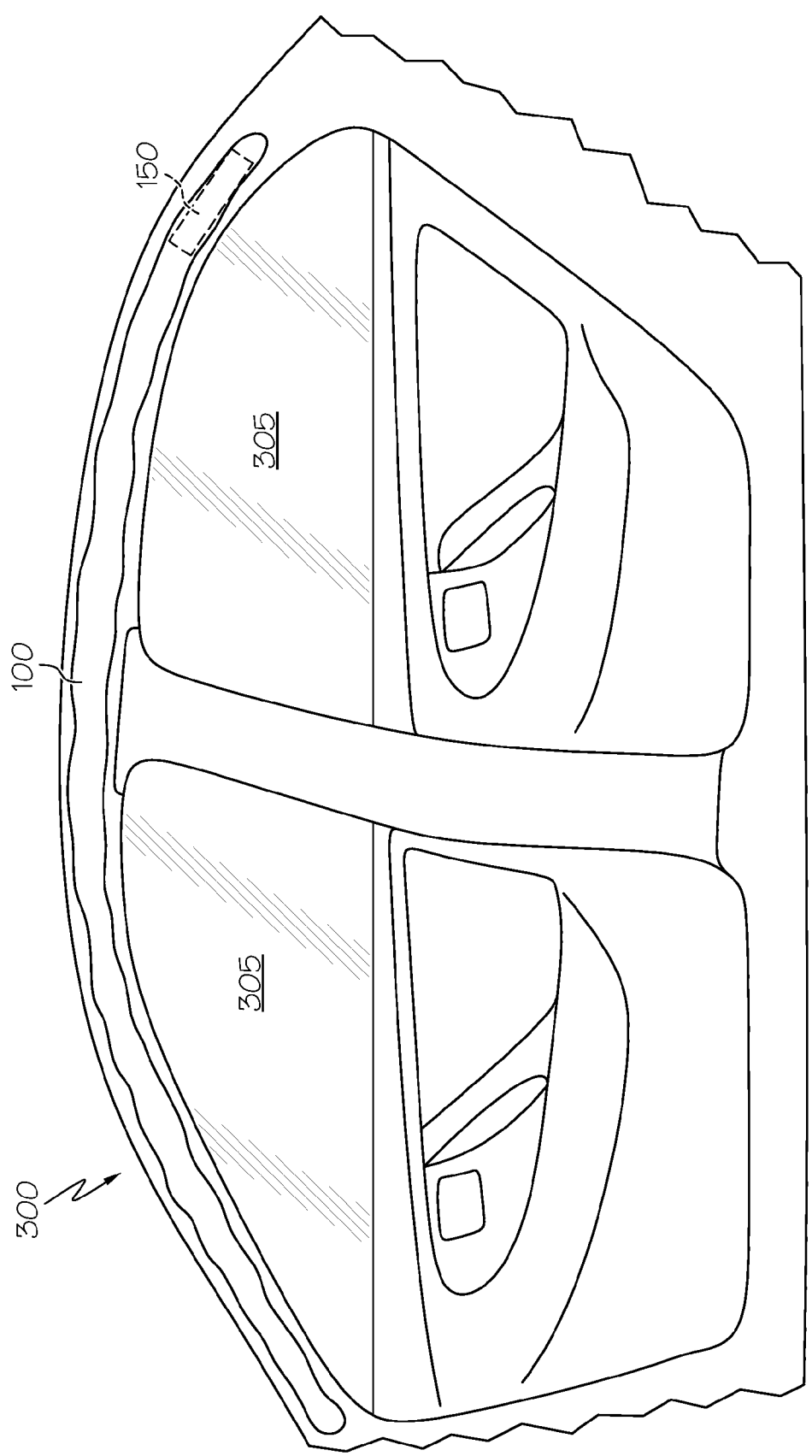
FIG. 3 schematically depicts a perspective view of a side curtain airbag installed in the roof of a vehicle, according to one or more embodiments shown and described herein.

In order to install the side curtain airbag 100 in the vehicle 300, the side curtain airbag may be rolled up/folded into a compact state that will fit within the compartment in which the side curtain airbag 100 is stored. Referring now to FIG. 3, a perspective view of the side curtain airbag 100 when rolled up and installed above windows 305 in a vehicle 300 is schematically depicted. When installed above the windows 305 in the vehicle 300, the non-inflatable support member 150 may be rolled up inside of the side curtain airbag 100, as indicated by the dashed lines depicted in FIG. 3. However, it should be understood that the exact position and orientation of the non-inflatable support member 150 in the rolled up and installed side curtain airbag 100 may be different than what is depicted in FIG. 3.

Figure 4:
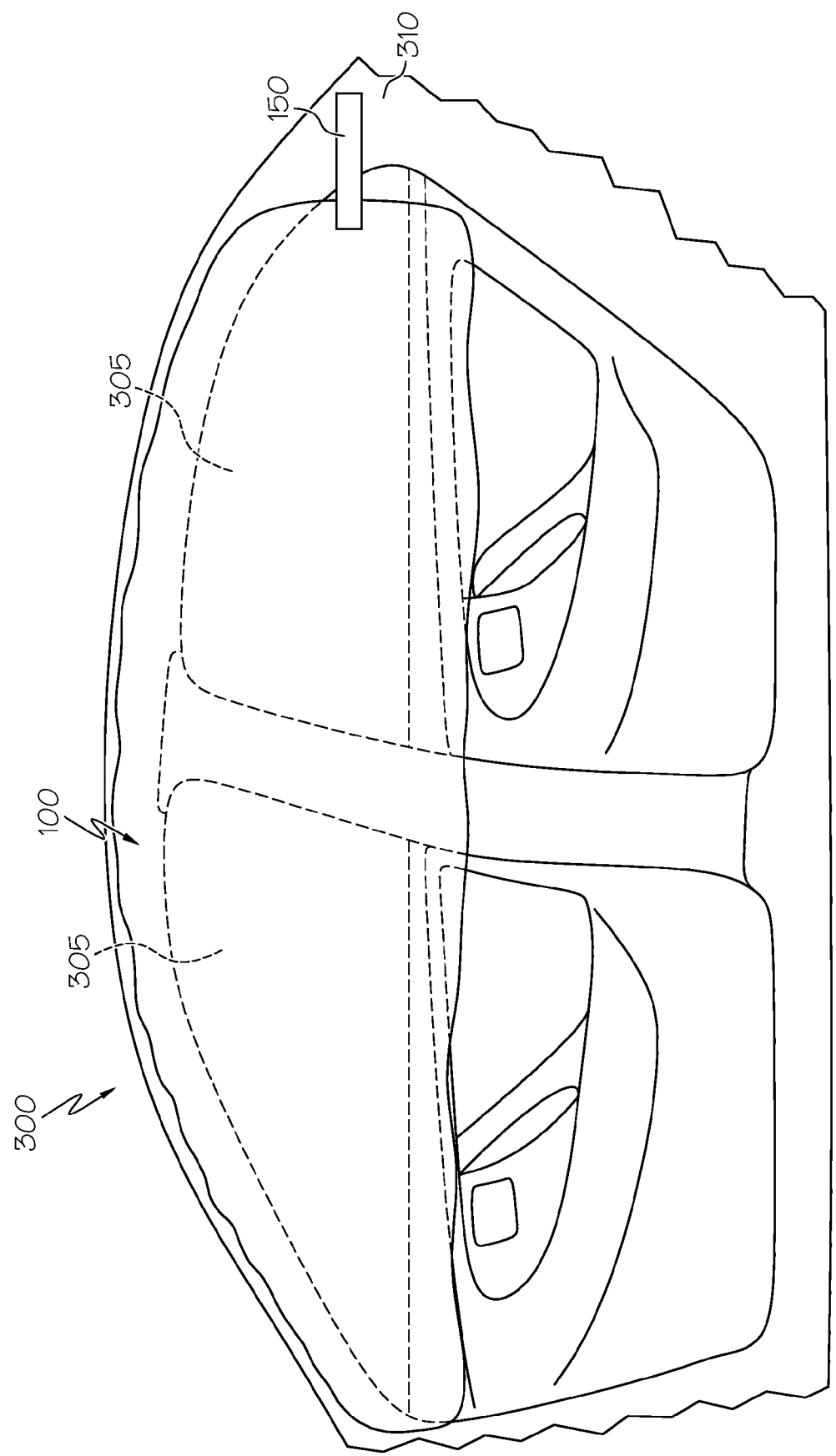
FIG. 4 schematically depicts a perspective view of the side curtain airbag of FIG. 3 when the airbag is in a deployed state, according to one or more embodiments shown and described herein.

When deployed, gas is introduced into the side curtain airbag 100, causing the side curtain airbag 100 to expand and unroll, covering windows 305. As shown in FIG. 4, when the side curtain airbag 100 is in a deployed state, the non-inflatable support member 150 contacts an interior portion of the vehicle 300, thereby supporting the side curtain airbag 100. In one embodiment, the interior portion contacted by the non-inflatable support member 150 of the deployed side curtain airbag 100 is a trim panel 310. When the non-inflatable support member 150 contacts the trim panel 310, the non-inflatable support member 150 supports the deployed side curtain airbag.

It should now be understood that airbags including hingedly attached non-inflatable support members, as described herein, support the airbag when it is in a deployed state. Further, in the context of airbags in vehicles, vehicle airbags including hingedly attached non-inflatable support members, as described herein, may support the vehicle airbag when in a deployed state, while reducing the number of attachments of the vehicle airbag to the vehicle and/or reducing the gas volume required to inflate the vehicle airbag.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. An airbag comprising a body portion, a non-inflatable support member having a proximal end and a distal end, and a tether having a support-member-end and an airbag-end, wherein:
   the proximal end of the non-inflatable support member is hingedly affixed to the body portion of the airbag; and
   the support-member-end of the tether is affixed to the distal end of the non-inflatable support member and the airbag-end of the tether is affixed to the body portion of the airbag, thereby tethering the distal end of the non-inflatable support member to the airbag, wherein:
when the airbag is in a pre-deployment state, the non-inflatable support member is folded over the body portion in a pre-deployment position, in which the distal end of the non-inflatable support member does not extend beyond a perimeter of the airbag; and
as the airbag fills with gas when deployed, the airbag expands and creates tension in the tether, which is translated to the distal end of the non-inflatable support member, thereby pulling the non-inflatable support member to a deployed position that extends beyond the perimeter of the airbag.

2. The airbag of claim 1 further comprising a first non-inflatable portion directly adjacent to the perimeter, wherein the non-inflatable support member is hingedly affixed to the first non-inflatable portion.

3. The airbag of claim 2 further comprising a second non-inflatable portion not directly adjacent to the perimeter, wherein the airbag-end of the tether is affixed to the second non-inflatable portion.

4. The airbag of claim 1, wherein the airbag is installed in a vehicle and the non-inflatable support member contacts an interior portion of the vehicle when the non-inflatable support member is in the deployed position.

5. The airbag of claim 4, wherein the airbag is a side curtain airbag.

6. The airbag of claim 1, wherein the body portion includes an inflatable portion that inflates with gas when the airbag is deployed and a non-inflatable portion that does not inflate with gas when the airbag is deployed.

7. The airbag of claim 6, wherein the airbag-end of the tether is affixed to the non-inflatable portion.

8. The airbag of claim 1, wherein the non-inflatable support member is hingedly affixed to the body portion of the airbag by stitching.

9. The airbag of claim 1, wherein:
the body portion of the airbag includes a first side and a second side;
the non-inflatable support member is folded over the first side of the body portion in the pre-deployment position; and
the tether is routed from the distal end of the non-inflatable support member, along a side of the non-inflatable support member not facing the first side of the body portion, around the perimeter of the airbag, and along the second side of the body portion of the airbag.

10. The airbag of claim 1, wherein the non-inflatable support member is integrally formed with the fabric of the airbag.

11. The airbag of claim 1, wherein the non-inflatable support member is formed from plastic, metal or a composite material.

12. A vehicle comprising a passenger compartment and an airbag located within the passenger compartment, wherein the airbag comprises a body portion, a non-inflatable support member having a proximal end and a distal end, and a tether having a support-member-end and an airbag-end, wherein:
the proximal end of the non-inflatable support member is hingedly affixed to the body portion of the airbag; and
the support-member-end of the tether is affixed to the distal end of the non-inflatable support member and the airbag-end of the tether is affixed to the body portion of the airbag, thereby tethering the distal end of the non-inflatable support member to the airbag, wherein:
when the airbag is in a pre-deployment state, the non-inflatable support member is folded over the body portion in a pre-deployment position, in which the distal end of the non-inflatable support member does not extend beyond a perimeter of the airbag; and
as the airbag fills with gas when deployed, the deploying airbag creates tension in the tether, which is translated to the distal end of the non-inflatable support member, thereby pulling the non-inflatable support member to a deployed position that extends beyond the perimeter of the airbag and contacts an interior portion of the passenger compartment of the vehicle to support the deployed airbag.

13. The vehicle of claim 12, wherein the interior portion is a trim panel, such that when the non-inflatable support member is in the deployed position, the non-inflatable support member contacts the trim panel, thereby supporting the deployed airbag.

14. The vehicle of claim 12, wherein the airbag further comprising a first non-inflatable portion directly adjacent to the perimeter, wherein the non-inflatable support member is hingedly affixed to the first non-inflatable portion.

15. The vehicle of claim 14, wherein the airbag further comprising a second non-inflatable portion not directly adjacent to the perimeter, wherein the airbag-end of the tether is affixed to the second non-inflatable portion.

16. The vehicle of claim 12, wherein the body portion of the airbag includes an inflatable portion that inflates with gas when the airbag is deployed and a non-inflatable portion that does not inflate with gas when the airbag is deployed.

17. The vehicle of claim 12, wherein:
the body portion of the airbag includes a first side and a second side;
the non-inflatable support member is folded over the first side of the body portion in the pre-deployment position; and
the tether is routed from the distal end of the non-inflatable support member, along a side of the non-inflatable support member not facing the first side of the body portion, around the perimeter of the airbag, and along the second side of the body portion of the airbag.

18. The vehicle of claim 12, wherein the airbag is a side curtain airbag.

19. An airbag comprising a body portion, a non-inflatable support member having a proximal end and a distal end, and a tether having a support-member-end and an airbag-end, wherein:
the body portion includes an inflatable portion that inflates with gas when the airbag is deployed and a non-inflatable portion that does not inflate with gas when the airbag is deployed;
the proximal end of the non-inflatable support member is hingedly affixed to the body portion of the airbag; and
the support-member-end of the tether is affixed to the distal end of the non-inflatable support member and the airbag-end of the tether is affixed to the non-inflatable portion of the body portion of the airbag, thereby tethering the distal end of the non-inflatable support member to the airbag, wherein:
when the airbag is in a pre-deployment state, the non-inflatable support member is folded over the body portion in a pre-deployment position, in which the distal end of the non-inflatable support member does not extend beyond a perimeter of the airbag; and
as the airbag fills with gas when deployed, the deploying airbag creates tension in the tether, which is translated to the distal end of the non-inflatable support member, thereby pulling the non-inflatable support member to a deployed position that extends beyond the perimeter of the airbag.

20. The airbag of claim 19 further comprising a first non-inflatable portion directly adjacent to the perimeter and a second non-inflatable portion not directly adjacent to the perimeter, wherein the non-inflatable support member is hingedly affixed to the first non-inflatable portion and the airbag-end of the tether is affixed to the second non-inflatable portion.

\* \* \* \* \*